(12) United States Patent
Mittelberger et al.

(10) Patent No.: US 8,246,509 B2
(45) Date of Patent: Aug. 21, 2012

(54) METHOD FOR OPERATING A DRIVE TRAIN

(75) Inventors: Christian Mittelberger, Ravensburg (DE); Stefan Blattner, Vogt (DE)

(73) Assignee: ZF Friedrichshafen, Friedrichshafen (DE)

( * ) Notice: Subject to any disclaimer, the term of this patent is extended or adjusted under 35 U.S.C. 154(b) by 227 days.

(21) Appl. No.: 12/677,147

(22) PCT Filed: Sep. 16, 2008

(86) PCT No.: PCT/EP2008/062272
§ 371 (c)(1),
(2), (4) Date: Mar. 9, 2010

(87) PCT Pub. No.: WO2009/037237
PCT Pub. Date: Mar. 26, 2009

(65) Prior Publication Data
US 2010/0197450 A1    Aug. 5, 2010

(30) Foreign Application Priority Data
Sep. 22, 2007   (DE) .......................... 10 2007 045 366

(51) Int. Cl.
*B60W 10/08* (2006.01)
(52) U.S. Cl. ............................................. 477/5
(58) Field of Classification Search ........................ 477/5
See application file for complete search history.

(56) References Cited

U.S. PATENT DOCUMENTS

| | | | |
|---|---|---|---|
| 6,077,186 A | 6/2000 | Kojima et al. | |
| 6,543,561 B1 * | 4/2003 | Pels et al. | 180/65.23 |
| 6,997,275 B2 | 2/2006 | Mesiti et al. | |
| 7,131,510 B2 * | 11/2006 | Mesiti et al. | 180/65.25 |
| 7,360,616 B2 * | 4/2008 | Schiele | 180/65.265 |
| 7,370,715 B2 * | 5/2008 | Colvin et al. | 180/65.28 |
| 7,766,107 B2 * | 8/2010 | Joe et al. | 180/65.21 |
| 7,975,791 B2 * | 7/2011 | Nozaki et al. | 180/65.6 |
| 8,047,959 B2 * | 11/2011 | Fuechtner et al. | 477/5 |
| 8,123,657 B2 * | 2/2012 | Mittelberger et al. | 477/5 |
| 2005/0221947 A1 | 10/2005 | Mesiti et al. | |
| 2006/0169504 A1 * | 8/2006 | Oliver et al. | 180/65.2 |
| 2007/0056783 A1 | 3/2007 | Joe et al. | |
| 2007/0102211 A1 | 5/2007 | Nozaki et al. | |
| 2007/0114082 A1 | 5/2007 | Nozaki et al. | |
| 2008/0195266 A1 | 8/2008 | Le Neindre et al. | |
| 2008/0245332 A1 | 10/2008 | Rimaux et al. | |

(Continued)

FOREIGN PATENT DOCUMENTS
DE    198 14 402 A1    10/1999
(Continued)

*Primary Examiner* — Dirk Wright
(74) *Attorney, Agent, or Firm* — Davis & Bujold, PLLC

(57) ABSTRACT

A method for operating a drive train of a motor vehicle. The drive train comprising a hybrid drive with an internal combustion engine and an electric motor, a transmission arranged between the hybrid drive and a drive output, and a clutch arranged between the internal combustion engine and the electric motor. The internal combustion engine is started by engaging the clutch only when the electric motor is providing drive power. In this situation when shifting gears in the transmission with interruption of the traction force, immediately after the gear change and during a load build-up phase of the shift operation, the internal combustion engine is started by the electric motor without traction force interruption. The clutch is controlled to partially engage to start the combustion engine and then it is completely disengaged before reaching a synchronous speed between the combustion engine and the electric motor.

9 Claims, 1 Drawing Sheet

U.S. PATENT DOCUMENTS

2009/0124452 A1 5/2009 Fuechtner et al.
2010/0056328 A1 3/2010 Schenk et al.

FOREIGN PATENT DOCUMENTS

| | | |
|---|---|---|
| DE | 102 60 435 A1 | 7/2004 |
| DE | 103 27 306 A1 | 1/2005 |
| DE | 10 2006 048 358 A1 | 4/2008 |
| DE | 10 2006 049 888 A1 | 4/2008 |
| DE | 10 2007 001 424 A1 | 7/2008 |
| EP | 0 922 600 A2 | 6/1999 |
| EP | 1 785 305 A2 | 5/2007 |
| FR | 2 882 697 | 3/2005 |
| WO | 01/56824 A1 | 8/2001 |
| WO | 2004/111441 A1 | 12/2004 |
| WO | 2007/045785 A1 | 4/2007 |
| WO | 2008/049662 A1 | 5/2008 |

* cited by examiner

METHOD FOR OPERATING A DRIVE TRAIN

The application is a National Stage completion of PCT/EP2008/062272 filed Sep. 16, 2008, which claims priority from German patent application serial no. 10 2007 045 366.5 filed Sep. 22, 2007.

FIELD OF THE INVENTION

The invention concerns a method for operating a drive train of a motor vehicle comprising at least a transmission and a hybrid drive.

BACKGROUND OF THE INVENTION

The main components of a motor vehicle drive train are a drive assembly and a transmission. The transmission converts torques and rotational speeds, and thereby transmits the traction force provided by the drive assembly. The present invention concerns a method for operating a drive train comprising at least a transmission and a hybrid drive as its drive assembly.

From US 2005/0221947 A1 a method for operating a drive train of a motor vehicle that comprises an automatic transmission and a hybrid drive is known, in which a clutch is arranged between an internal combustion engine of the hybrid drive and an electric motor of the hybrid drive, and another clutch is arranged between the electric motor of the hybrid drive and the automatic transmission. When the drive train is being powered exclusively by the electric motor of the hybrid drive, according to the prior art the internal combustion engine of the hybrid drive can be started, such that while an upshift is taking place in the automatic transmission of the drive train, the clutch between the internal combustion engine of the hybrid drive and its electric motor is engaged. According to US 2005/0221947 A1 the electric motor of the hybrid drive is used in such a situation to start the internal combustion engine while a gearshift is being carried out, and accordingly during an interruption of traction force.

SUMMARY OF THE INVENTION

Starting from there, the present invention addresses the problem of providing a new type of method for operating a drive train comprising a transmission and a hybrid drive.

According to the invention, when, during electric motor powered driving with the electric motor running and the internal combustion engine not operating, a shift operation is carried out in the transmission to change gear with interruption of the traction force, the internal combustion engine is started by the electric motor without traction force interruption immediately after the gear change shifting operation and during a load build-up phase of the shift operation, and to do this the clutch arranged between the internal combustion engine and the electric motor is engaged and disengaged in a controlled manner such that the clutch is operated in a slipping mode by only partially engaging it in order to start the internal combustion engine, and after this it is completely disengaged again before a synchronous speed between the internal combustion engine and the electric motor has been reached.

The present invention is based on the idea of starting the internal combustion engine by means of the electric motor after carrying out a gearshift, during the load build-up phase of a shift operation and therefore after the traction force interruption has ended. Thus, the traction force interruption is not prolonged by starting the internal combustion engine and a load build-up of the shift operation that varies due to the starting of the internal combustion engine is not perceived as disturbing by the driver, so the internal combustion engine can be started very comfortably.

Preferably, the internal combustion engine is started by the electric motor during the load build-up phase of an upshift from a gear with a relatively high transmission ratio to a gear with a relatively low transmission ratio.

This has the advantage that the internal combustion engine is started while the gear with the lower transmission ratio is already engaged, so that a mass moment of inertia acting at the drive output is less troublesome.

BRIEF DESCRIPTION OF THE DRAWINGS

Preferred further developments of the invention emerge from the description given below. Example embodiments of the invention, to which it is not limited, are explained in more detail with reference to the drawings, which show.

DETAILED DESCRIPTION OF THE PREFERRED EMBODIMENTS

Figure 1:
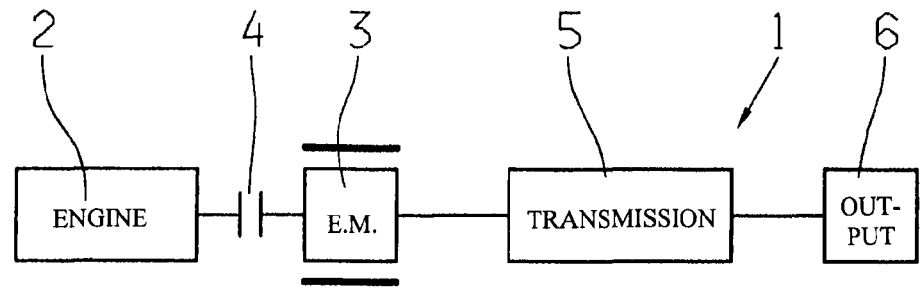
FIG. 1: A first layout of a motor vehicle drive train with which the method according to the invention can be used.
Figure 2:
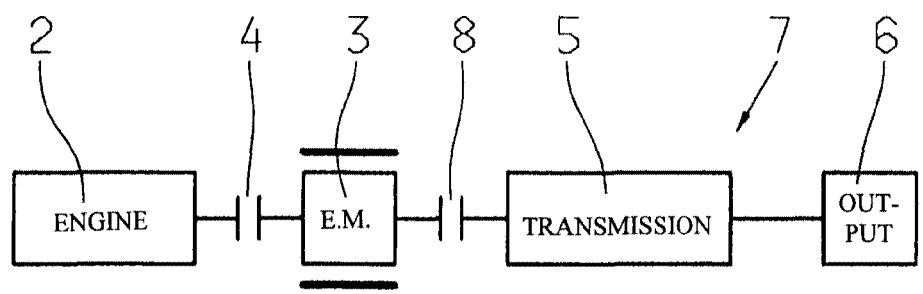
FIG. 2: A second layout of a motor vehicle drive train with which the method according to the invention can be used.
Figure 3:
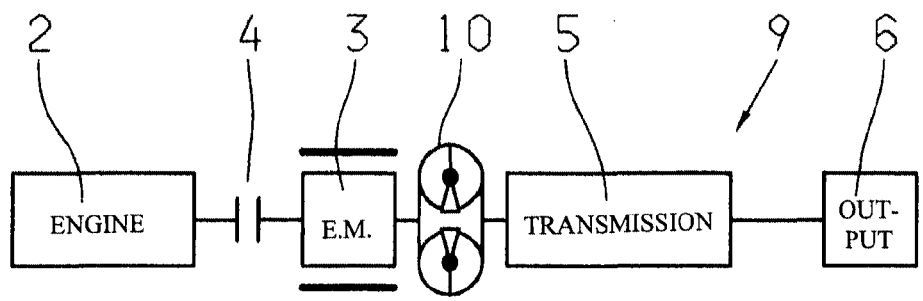
FIG. 3: A third layout of a motor vehicle drive train with which the method according to the invention can be used.

The invention concerns a method for operating a motor vehicle drive train that comprises at least a transmission and a hybrid drive. A hybrid drive comprises an internal combustion engine and an electric motor. FIGS. 1 to 3 show example motor vehicle drive train layouts with which the method according to the invention can be used.

Thus, FIG. 1 shows a layout of a motor vehicle drive train 1, the drive train 1 of FIG. 1 comprising a hybrid drive formed by an internal combustion engine 2 and an electric motor 3. Between the internal combustion engine 2 and the electric motor 3 is connected a clutch 4 which is disengaged when the drive train 1 is being powered exclusively by the electric motor 3. Besides the hybrid drive, the drive train 1 of FIG. 1 also comprises a transmission 5 which transmits the traction force produced by the hybrid drive to a drive output 6 of the drive train, namely driven wheels.

In the drive train 7 of FIG. 2 a clutch 8 is connected between the electric motor 3 of the hybrid drive and the transmission 5. FIG. 3 shows a further layout of a drive train 9 of a motor vehicle, the drive train in FIG. 3 differing from the drive train of FIG. 2 in that no clutch, but instead a converter device 10 is connected between the electric motor 3 of the hybrid drive and the transmission 5.

When a drive train according to FIG. 1, 2 or 3 is being powered exclusively by the electric motor 3 of the hybrid drive with the clutch 4 disengaged, under certain operating conditions it may be necessary to start the internal combustion engine 2 of the hybrid drive.

In the context of the present invention, when, during purely electric motor powered driving with the electric motor 3 running and the internal combustion engine 2 not operating, a shift operation is carried out, immediately after carrying out the gear change of the shift operation and during a load build-up phase of the latter, i.e. once the traction force interruption has ended, the internal combustion engine 2 is started by the electric motor 3 without interruption of the traction force and to do this the clutch 4 arranged between the internal combustion engine 2 and the electric motor 3 is engaged and disengaged in a controlled manner, namely such that by partial engagement, the clutch 4 is operated in a slipping mode in order to start the internal combustion engine, and this, before a synchronous speed between the internal combustion engine 2 and the electric motor 3 has been reached.

Accordingly, the internal combustion engine 2 is started after carrying out the gear change during a load build-up phase of the shift operation, and thus when the electric motor 3 is coupled to the drive output 6 of the drive train.

According to an advantageous further development of the present invention the internal combustion engine 2 is started by the electric motor 3 during the load build-up phase of an upshift from a gear with a relatively high transmission ratio to a gear with a relatively low transmission ratio. This has the advantage that the internal combustion engine 2 is started when the gear with the relatively low transmission ratio is already engaged, so that the torque irregularity is reduced and a mass moment of inertia of the internal combustion engine acting at the drive output is less troublesome. Alternatively, however, the internal combustion engine 2 can also be started by the electric motor 3 during the load build-up phase of a downshift from a gear with a relatively low transmission ratio to a gear with a relatively high transmission ratio.

To start the internal combustion engine 2 by means of the electric motor 3 during the load build-up phase of a shift operation to be carried out, the electric motor is coupled to the drive output 6 of the drive train without traction force interruption, so that to start the internal combustion engine 2 the speed of the electric motor 3 is higher than a starting speed of the internal combustion engine 2.

Once the internal combustion engine 2 has started, it is coupled to the drive output 6 of the drive train concerned by engaging the clutch 4 arranged between the internal combustion engine 2 and the electric motor 3, so that the drive train is then powered by the running electric motor 3 and the running internal combustion engine 2.

The controlled engaging and disengaging of the clutch 4 connected between the internal combustion engine 2 and the electric motor 3 when the internal combustion engine 2 is started during the load build-up phase of the shift operation, takes place in such manner that the clutch 4 is first partially engaged, up to a point where it is slipping and where the torque transmitted by the clutch 4 overcomes an initial breakaway torque of the internal combustion engine 2.

Then, the partially engaged position of the clutch and therefore the torque transmitted by it are kept constant, and after that the clutch is completely disengaged again, the latter before the synchronous speed between the internal combustion engine 2 and the electric motor 3 has been reached.

In a first advantageous further development of the invention, the above-defined engaging and disengaging of the clutch 4 can take place in a time-controlled manner, such that for this, in a first specified time interval the clutch 4 is partially engaged to the point where it transmits the torque required for overcoming the breakaway torque, and then, for a second specified time interval, the partly engaged position of the clutch 4 is kept constant, and finally, in a third specified time interval, the clutch 4 is completely disengaged again. The time intervals are specified but can also be learned adaptively.

In a second advantageous further development of the method according to the invention, the defined controlled engaging and disengaging of the clutch 4 arranged between the internal combustion engine 2 and the electric motor 3 in order to start the internal combustion engine 2 during the load build-up phase of the shift operation, takes place in a speed-controlled manner such that for this, the clutch 4 is partially engaged to a point where a first specified speed threshold of the internal combustion engine 2 is reached, at which the breakaway torque of the internal combustion engine 2 is overcome. After the first specified speed threshold has been reached, the partially engaged clutch position reached is kept constant until a second specified speed threshold is reached, such that when the second specified speed threshold has been reached the internal combustion engine 2 starts or picks up autonomously.

Then, the clutch 4 is completely disengaged again, and this in such manner that the clutch 4 has completely disengaged before the synchronous speed between the internal combustion engine 2 and the electric motor 3 has been reached.

During the above controlled engagement and subsequent disengagement of the clutch 4 arranged between the internal combustion engine 2 and the electric motor 3 in order to start the internal combustion engine 2 during the load build-up phase of the shift operation, the drive torque provided by the electric motor, which is permanently applied at the drive output, is kept constant. To increase comfort, however, it is possible as an alternative that the drive torque provided by the electric motor 3 during the partial engagement and subsequent disengagement of the clutch 4 is varied, in order to compensate for the torque transmitted by the clutch 4 to the internal combustion engine 2 and thereby to ensure an approximately constant drive torque at the drive output 6.

INDEXES

1 Drive train
2 Internal combustion engine
3 Electric motor
4 Clutch
5 Transmission
6 Drive output
7 Drive train
8 Clutch
9 Drive train
10 Converter device

The invention claimed is:

1. A method of operating a drive train of a motor vehicle, the drive train comprising a hybrid drive with an internal combustion engine and an electric motor, a transmission being arranged between the hybrid drive and a drive output, and a clutch being arranged between the internal combustion engine and the electric motor, in which, when only the electric motor is working, the internal combustion engine is started by engaging the clutch between the internal combustion engine and the electric motor, the method comprising the steps of:

when, during electric motor powered driving with the electric motor running and the internal combustion engine not operating, carrying out a shift operation in the transmission to change gear with an interruption of the traction force, immediately after the gear change of the shift operation and during a load build-up phase of the shift operation, starting the internal combustion engine with the electric motor without a traction force interruption by engaging and disengaging the clutch, arranged between the internal combustion engine and the electric motor, in a controlled manner such that by being partially engaged the clutch is brought to a slipping condition for starting the internal combustion engine, and then completely disengaging the clutch again before reaching a synchronous speed between the internal combustion engine and the electric motor.

2. The method according to claim 1, further comprising the step of starting the internal combustion engine with the electric motor during an upstream load build-up phase from a gear with a relatively high transmission ratio to a gear with a relatively low transmission ratio.

3. The method according to claim 1, further comprising the step of starting the internal combustion engine with the electric motor during a downstream load build-up phase from a gear with a relatively low transmission ratio to a gear with a relatively high transmission ratio.

4. The method according to claim 1, further comprising the step of coupling the electric motor to the drive output of the drive train, without a traction force interruption, for starting the internal combustion engine, and a speed of the electric motor is higher than a starting speed of the internal combustion engine to facilitate starting of the internal combustion engine.

5. The method according to claim 1, further comprising the step of coupling the internal combustion engine to the drive output, after starting the internal combustion engine, by engaging the clutch between the internal combustion engine and the electric motor such that the drive train is then driven by both the electric motor and by the internal combustion engine.

6. The method according to claim 1, further comprising the step of partially engaging the clutch, between the internal combustion engine and the electric motor, until the transmitted torque of the clutch overcomes an initial breakaway torque of the internal combustion engine to start the internal combustion engine, then maintaining the partially engaged position of the clutch, and then completely disengaging the clutch.

7. The method according to claim 6, further comprising the step of partially engaging the clutch in a time-controlled manner such that, during a first specified time interval, the clutch is partially engaged as far as a point where the clutch transmits the torque required to overcome the breakaway torque, then maintaining the partially engaged position of the clutch for a second specified time interval, and then completely disengaging the clutch during a third specified time interval.

8. The method according to claim 6, further comprising the step of partially engaging the clutch in a speed-controlled manner such that the clutch is partially engaged as far as a point where a first specified speed threshold of the internal combustion engine is reached, then maintaining the partially engaged position of the clutch until a second specified speed threshold of the internal combustion engine is reached, and then completely disengaging the clutch.

9. A method for starting an internal combustion engine of a drive train of a hybrid drive motor vehicle when the internal combustion engine is not operating, and the electric motor is exclusively providing drive power to the drive train, the drive train comprising a hybrid drive with the internal combustion engine and an electric motor, a transmission being arranged between the hybrid drive and a drive output, and a clutch being arranged between the internal combustion engine and the electric motor, and the method comprising the steps of:

carrying out a gear shift operation in the transmission which interrupts a traction force;

controlling the clutch, arranged between the internal combustion engine and the electric motor, to partially engage and transmit drive to the internal combustion engine, immediately after a gear change in the gear shift operation to start the internal combustion engine without interruption of the traction force; and completely disengaging the clutch before the internal combustion engine and the electric motor reached a synchronous speed.

* * * * *